(12) United States Patent
Sawasaki

(10) Patent No.: US 7,440,073 B2
(45) Date of Patent: Oct. 21, 2008

(54) SUBSTRATE FOR LIQUID CRYSTAL DISPLAY DEVICE AND LIQUID CRYSTAL DISPLAY DEVICE HAVING THE SAME

(75) Inventor: Manabu Sawasaki, Kawasaki (JP)

(73) Assignees: Fujitsu Limited, Kawasaki (JP); AU Optronics Corporation (TW)

( * ) Notice: Subject to any disclaimer, the term of this patent is extended or adjusted under 35 U.S.C. 154(b) by 353 days.

(21) Appl. No.: 11/059,989

(22) Filed: Feb. 17, 2005

(65) Prior Publication Data
US 2006/0033878 A1    Feb. 16, 2006

(30) Foreign Application Priority Data
Aug. 13, 2004    (JP)    ............... 2004-235822

(51) Int. Cl.
*G02F 1/133*    (2006.01)
(52) U.S. Cl. .................. 349/158; 349/106; 349/130
(58) Field of Classification Search .................. 349/106, 349/158
See application file for complete search history.

(56) References Cited

U.S. PATENT DOCUMENTS

| | | | | | |
|---|---|---|---|---|---|
| 5,093,738 | A | * | 3/1992 | Watanabe et al. | ........... 349/106 |
| 5,493,429 | A | * | 2/1996 | Kanemoto et al. | ........... 349/106 |
| 5,568,293 | A | * | 10/1996 | Takao et al. | ................. 349/106 |
| 6,038,006 | A | * | 3/2000 | Sasaki et al. | ................. 349/106 |
| 2001/0026347 | A1 | * | 10/2001 | Sawasaki et al. | ............. 349/156 |

FOREIGN PATENT DOCUMENTS

| | | |
|---|---|---|
| JP | 10-206888 | 8/1998 |
| JP | 2000-147555 | 5/2000 |
| JP | 2002-236286 | 8/2002 |

* cited by examiner

*Primary Examiner*—David C. Nelms
*Assistant Examiner*—Matthew P Lawson
(74) *Attorney, Agent, or Firm*—Green, Burns & Crain, Ltd.

(57) ABSTRACT

A substrate for a liquid crystal display device produced at a low cost and featuring a good display quality, that can be used for a display unit of electronic equipment and a liquid display device having the same. The substrate for a liquid crystal display device, comprises a glass substrate for holding liquid crystal together with an opposing substrate, a plurality of pixel regions arranged on the glass substrate, drain bus lines formed on the glass substrate, CF resin layers of a plurality of colors the ends of which are arranged on the drain bus lines, a pixel electrode formed for each pixel region on the CF resin layers, a groove portion formed between the ends of the neighboring CF resin layers, and an organic insulating layer formed so as to fill the groove portion.

17 Claims, 15 Drawing Sheets

SUBSTRATE FOR LIQUID CRYSTAL DISPLAY DEVICE AND LIQUID CRYSTAL DISPLAY DEVICE HAVING THE SAME

BACKGROUND OF THE INVENTION

1. Field of the Invention

This invention relates to a substrate for a liquid crystal display device used in a display unit such as of electronic equipment and to a liquid crystal display device having the same.

2. Description of the Related Art

A liquid crystal display device, generally, has two pieces of substrates each provided with transparent electrodes, and a liquid crystal layer held between the two substrates. In the liquid crystal display device, a predetermined voltage is applied across the transparent electrodes to drive the liquid crystal, and the light transmission factor is controlled for each pixel to obtain a desired display. In recent years, the liquid crystal display device has been used for notebook PCs, TV sets, monitoring devices and projectors. The demand for the liquid crystal display devices is on the increase and is diversifying.

In the liquid crystal display device using general polarizer plates and color filters (CFs), the light transmission factor in the state of a panel is 3% to 10%, and the loss of optical energy from back light unit is great. The light transmission factor of the panel is almost determined by the light transmission factors of the polarizing plates and CF layers and by the aperture ratio of the pixels. In order to improve aperture ratio of the pixels, there has been proposed a CF-on-TFT (COT) structure in which the thin-film transistors (TFTs) and the CF layers are formed on the same substrate. In the liquid crystal display device of the COT structure, no sticking margin is necessary in sticking the TFT substrate and the opposing substrate together. Besides, the CF layer works as an interlayer insulating film being made of a thick organic material. Therefore, the ends of the pixel electrodes can be brought close to a bus line as viewing the substrate surface from a vertical direction, and the aperture ratio of the pixels can be improved.

The TFT substrate of the COT structure is fabricated through an array step and a CF step. Namely, in the COT structure, the yield of the CF step directly affects the TFT substrate. In the CF step, there are often carried out a step of forming a CF resin layer, a step of forming a resin black matrix (BM) for shutting light among the neighboring pixel regions, and a step of forming an over-coating (OC) layer on the whole surface of the CF resin layer. However, the steps of forming the resin BM and the OC layer require relatively difficult technology accounting for a drop in the production yield of the TFT substrates. In the liquid crystal display device of the COT structure, therefore, it is desired to provide neither the resin BM nor the OC layer on the TFT substrate from the standpoint of increasing the yield of production and decreasing the cost of production.

By using the CF rein layer of a large thickness of about 3.0 μm and by arranging the ends of the CF resin layer on the bus line among the neighboring pixel regions, neither the resin BM nor the OC layer may be used. That is, by forming the CF resin layer between the drain bus line and the pixel electrodes so as to work as an interlayer insulating film, there is no need of forming the OC layer. Further, by increasing the thickness of the CF resin layer, the capacitance Cds can be decreased and, hence, the ends of the pixel electrodes can be arranged close to the ends of the drain bus line and of the gate bus line (or so as to be partly overlapped) as viewing the substrate surface from a vertical direction. Namely, the two bus lines can also be used as the BM contributing to improving the aperture ratio of the pixels while omitting the BM.

FIG. 21 is a sectional view of when a conventional liquid crystal display device of the COT structure is cut in a direction perpendicular to a direction in which the drain bus line extends (JP-A-10-206888). Referring to FIG. 21, the liquid crystal display device includes a TFT substrate 102, an opposing substrate 104, and liquid crystal 106 sealed between the two substrates 102 and 104. The TFT substrate 102 has a plurality of gate bus lines (not shown) and a plurality of drain bus lines 114 intersecting the gate bus lines via an insulating film 130 on a glass substrate 110. On a pixel region on the insulating film 130, there are formed CF resin layers 140R (red), 140G (green) and 140B (blue) of three colors (FIG. 21 illustrates CF resin layers 140R and 140G) in the form of stripes extending in parallel with the drain bus line 114. On the CF resin layers 140R, 140G and 140B, a pixel electrode 116 is formed for each pixel region. The opposing electrode 104, on the other hand, has a common electrode 142 on a glass substrate 111.

An end (side end) 141R of, for example, the CF resin layer 140R is disposed on the drain bus line 114 so will not to extend to the neighboring pixel region. An end 141G of the CF resin layer 140G neighboring the CF resin layer 140R is disposed on the drain bus line 114 so will not to extend to the neighboring pixel region. The end 141G of the CF resin layer 140G is overlapping the end 141R of the CF resin layer 140R. An overlapping region where the CF resin layer 140G (end 141G) is overlapped on the CF resin layer 140R (end 141R) is formed on the drain bus line 114 only. The region where the drain bus line 114 is formed serves as a light-shielding region. Therefore, the colors are not mixed even if the CF resin layer 140G and the CF resin layer 140R are overlapped one upon the other. Further, the sum of thicknesses of the CF resin layers 140R, 140G on the overlapped region is nearly equal to the thickness of the CF resin layers 140R and 140G in other regions.

Here, the CF resin layers 140R, 140G and 140B are usually patterned relying upon a proximity exposure system having a relatively low precision. FIG. 21 illustrates an ideally patterned state. In the proximity exposure, however, a relative positional deviation may occur between the neighboring CF resin layers 140R and 140G. FIG. 22 is a sectional view illustrating the constitution of the liquid crystal display device in which the CF resin layer 140R is patterned being deviated toward the CF resin layer 140G. As illustrated in FIG. 22, the end 141R of the CF resin layer 140R extends to the neighboring pixel region exceeding the drain bus line 114. Therefore, the region where the CF resin layers 140R and 140G are overlapped extends into the pixel region G, causing the colors to be mixed and the display quality to be deteriorated.

On the other hand, if the CF resin layers 140R, 140G and 140B are patterned relying upon the step projection exposure system or the mirror projection exposure system featuring excellent positioning precision so as not to cause positional deviation of the CF resin layers 140R, 140G and 140B, the liquid crystal display device of the COT structure is produced at an increased cost.

FIG. 23 is a sectional view illustrating a conventional liquid crystal display device of the COT structure for solving the above problems (JP-A-2002-236286). In FIG. 23, the CF resin layers 140R and 140G are so formed as will not be overlapped at all or as will be overlapped only partly. Therefore, a groove portion 144 is formed on the drain bus line 114 having a groove depth nearly equal to the thickness of the CF resin layers 140R and 140G. The CF resin layers 140R and 140G do not extend to the neighboring pixel regions even if a relative positional deviation occurs during the patterning. Therefore, even when the CF resin layers 140R, 140G and 140B are formed relying upon the proximity exposure system, the quality of display is not deteriorated by the mixing of colors.

In the state illustrated in FIG. 23, however, there exists a region where the CF resin layer 140 also serving as an interlayer insulating film does not exist on the drain bus line 114 or is existing thereon but having a thickness which is not large enough. FIG. 24 illustrates the vicinity of the drain bus line 114 on an enlarged scale. Referring to FIG. 24, when the interlayer insulating film having a sufficient thickness does not exist on the drain bus line 114, the electric capacitance Cds increases between the drain bus line 114 and the pixel electrode 116 arousing a problem in that display unevenness becomes conspicuous due to crosstalk and fine deviation occurring at the seam of the exposing machine. To suppress the display unevenness, it becomes necessary to form a resin BM or to widen a gap between the drain bus line 114 and the pixel electrode 116. This causes an increase in the cost of producing the liquid crystal display device and a decrease in the light transmission factor due to a decrease in the aperture ratio of the pixels.

SUMMARY OF THE INVENTION

It is an object of this invention to provide a substrate for a liquid crystal display device capable of obtaining a good display quality at a low cost, and a liquid crystal display device having the same.

The above object is accomplished by a substrate for a liquid crystal display device, comprising a base substrate for holding liquid crystal together with an opposing substrate that is disposed in an opposing manner, a plurality of pixel regions arranged on the base substrate, a plurality of bus lines formed on the base substrate and intersecting one another via an insulating film, color filter layers of a plurality of colors the ends of which are arranged on the bus lines, a pixel electrode formed for each pixel region on the color filter layers, a groove portion formed between the ends of the neighboring color filter layers, and an organic insulating layer formed so as to fill the groove portion.

The present invention realizes a liquid crystal display device capable of obtaining a good display quality at a low cost.

DETAILED DESCRIPTION OF THE INVENTION

Figure 1:
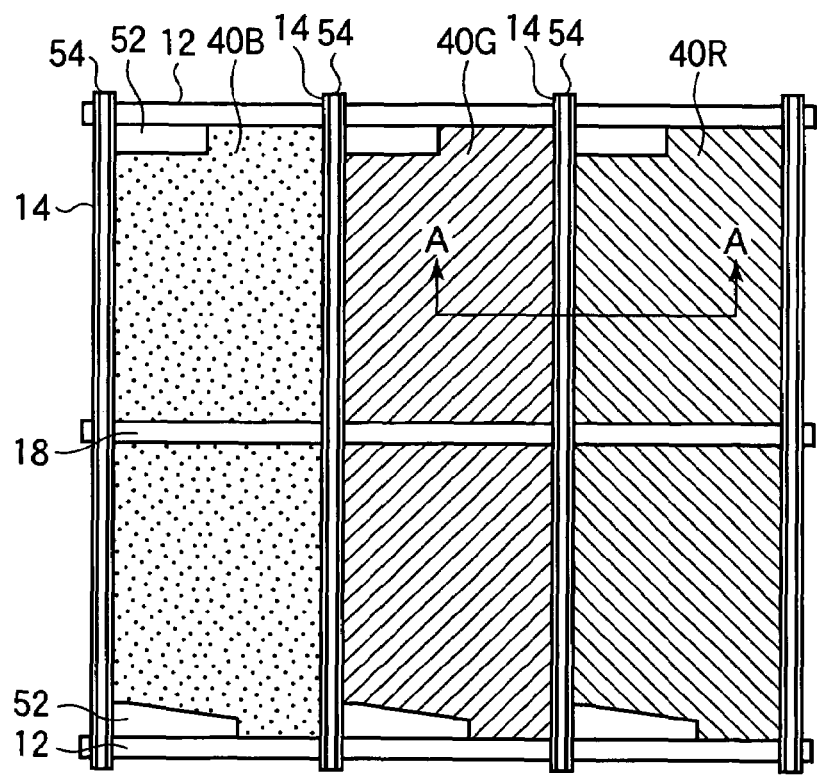
FIG. 1 is a view illustrating the constitution of a liquid crystal display device according to an embodiment of the invention.
Figure 2:
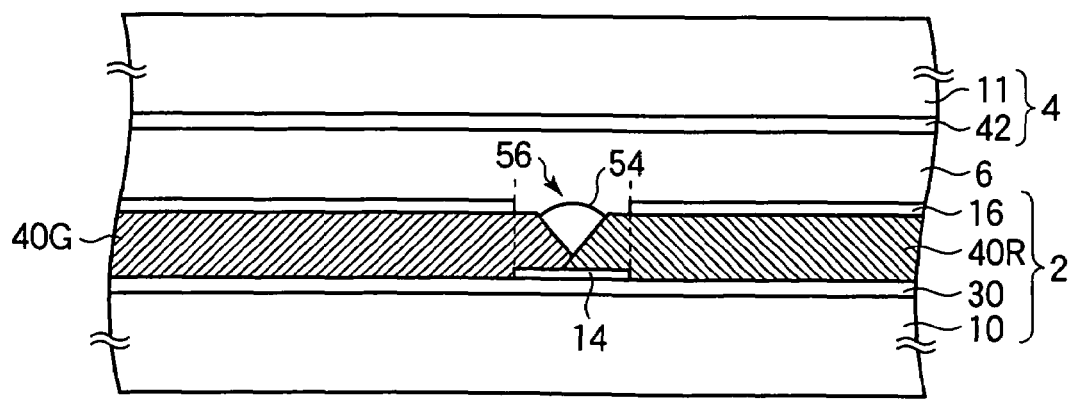
FIG. 2 is a sectional view illustrating the constitution of the liquid crystal display device according to the embodiment of the invention.

A substrate for a liquid crystal display device and a liquid crystal display device having the same according to an embodiment of the invention will now be described with reference to FIGS. 1 to 20C. FIG. 1 is a view illustrating the constitution of three pixels R, G and B in the liquid crystal display device according to the embodiment. FIG. 2 is a sectional view illustrating the constitution of the liquid crystal display device cut along the line A-A in FIG. 1. Referring to FIGS. 1 and 2, the liquid crystal display device includes a TFT substrate (base substrate) 2 and an opposing substrate 4 arranged facing each other, and liquid crystal 6 sealed between the two substrates 2 and 4. The TFT substrate 2 has a plurality of gate bus lines 12 extending in the right-and-left direction in FIG. 1, and a plurality of drain bus lines 14 extending in the up-and-down direction in FIG. 1 intersecting the gate bus lines 12 via an insulating film 30 on a transparent glass substrate 10. Pixel regions are sectionalized by the gate bus lines 12 and the drain bus lines 14. A storage capacitor bus line 18 is formed between the two neighboring gate bus lines 12 traversing the pixel regions. CF resin layers 40 (40R, 40G and 40B) of three colors of a striped shape are formed on the insulating film 30 extending in parallel with the drain bus lines 14. The CF resin layer 40 of any color of R, G or B is formed in each pixel region. A pixel electrode 16 is formed for each pixel region on the CF resin layer 40. When viewed perpendicularly to the substrate surface, the pixel electrode 16, the gate bus line 12 and the drain bus line 14 are not overlapped, and the end of the pixel electrode 16 is in agreement with the ends of the gate bus line 12 and of the drain bus line 14.

A TFT (not shown) is arranged for each pixel region near a position where the gate bus line 12 intersects the drain bus line 14. On the TFT, there is formed a TFT-shielding portion 52 comprising a CF resin layer 40 of laminated layers of a plurality of colors or of a single layer to shield the TFT. The opposing substrate 4, on the other hand, has a common electrode 42 on nearly the whole surface of the transparent glass substrate 11.

FIG. 2 illustrates a state where the CF resin layers 40R and 40G are patterned nearly ideally, and the left end (side end) in the drawing of the CF resin layer 40R and the right end in the drawing of the CF resin layer 40G are arranged being overlapped on the drain bus line 14. Further, a groove 56 is formed intentionally between the ends of the neighboring CF resin layers 40R and 40G. An organic insulating layer 54 of a material different from the CF resin layer 40 is formed on the groove portion 56. For example, the organic insulating layer 54 nearly completely fills the groove portion 56, and the height of its surface from the substrate surface is greater than the height of the surface of the CF resin layer 40 from the substrate surface. The organic insulating layer 54 works as an interlayer insulating film together with the CF resin layer 40. Thus, the interlayer insulating film having a sufficiently large thickness is formed on the drain bus line 14. This makes it possible to decrease the electric capacitance Cds that occurs between the drain bus line 14 and the pixel electrode 16, and to control the display unevenness that appears due to crosstalk and fine deviation that occurs at the seam generated at the time of exposure. Therefore, there is obtained a liquid crystal display device having a good display quality. In this embodiment, no OC layer is formed to cover nearly the whole surface of the CF resin layer 40. Since the OC layer and resin BM layer are not formed on the organic insulating layer 54 and the pixel electrode 16, the organic insulating layer 54 and the pixel electrode 16 are adjacent to the liquid crystal 6 via an alignment film which is not shown. The organic insulating layer 54 is formed on only the drain bus line 14 on where the ends of the CF resin layers 40 are neighboring each other. As compared to when the OC layer is formed on the whole surface, therefore, no foreign matter infiltrates suppressing a drop in the yield of producing the TFT substrates 2.

Figure 3:
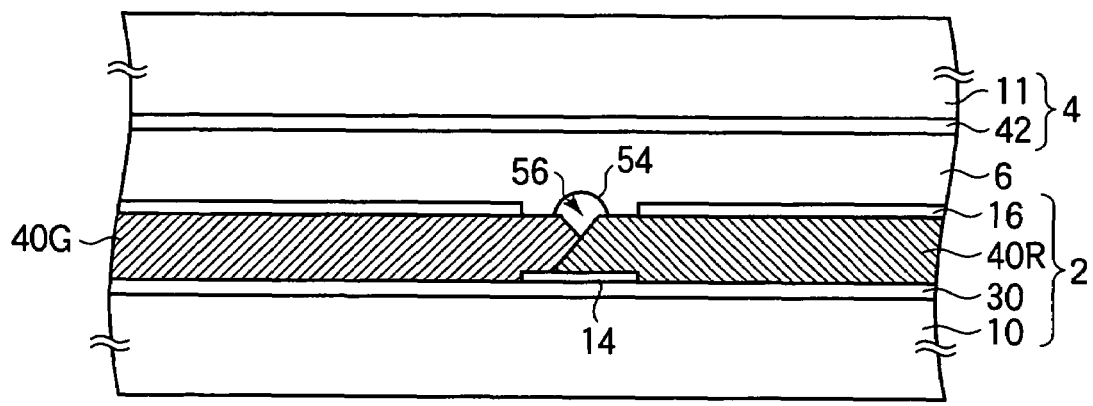
FIG. 3 is a sectional view illustrating the constitution of the liquid crystal display device in which the CF resin layers are patterned being deviated in a direction in which they approach each other.

FIG. 3 is a sectional view illustrating the constitution of the liquid crystal display device in which the CF resin layers 40R and 40G are patterned being deviated in a direction in which they approach each other. In this embodiment as illustrated in FIG. 3, even when the CF resin layers 40R and 40G are patterned being deviated in a direction in which they approach each other, the CF resin layers 40R and 40G do not extend to the neighboring pixel regions in excess of the drain bus line 14, and colors are not mixed together. In this case, the depth of the groove portion 56 becomes small and the organic insulating layer 54 is formed swelling beyond the surface of the CF resin layer 40 without, however, arousing any problem.

Figure 4:
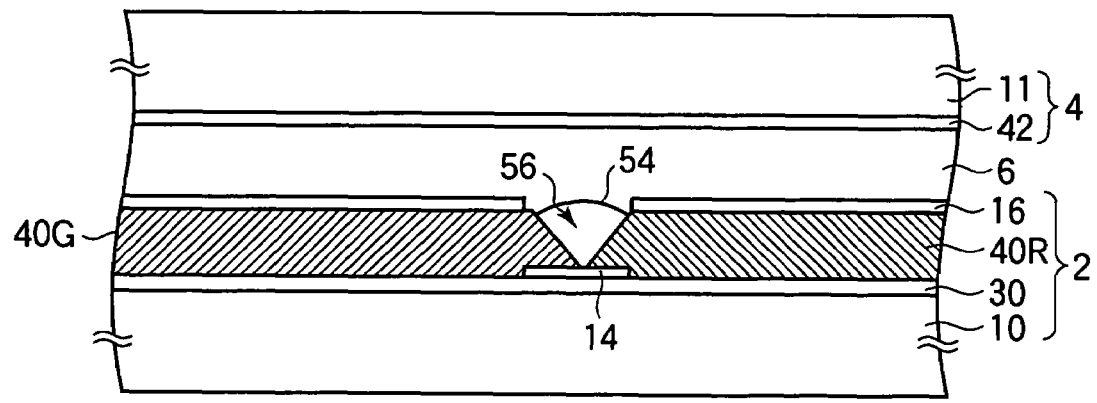
FIG. 4 is a sectional view illustrating the constitution of the liquid crystal display device in which the CF resin layers are patterned being deviated in a direction in which they separate away from each other.

FIG. 4 is a sectional view illustrating the constitution of the liquid crystal display device in which the CF resin layers 40R and 40G are patterned being deviated in a direction in which they are separated away from each other. When the CF resin layers 40R and 40G are patterned being deviated in a direction in which they are separated away from each other as shown in FIG. 4, there occurs a case where the CF resin layers 40R and 40G do not exist on a portion of the drain bus line 14 or a case where the CF resin layers 40R and 40G exist in a decreased thickness on the drain bus line 14. Even in the above cases according to this embodiment, an interlayer insulating layer is formed by the organic insulating layer 54 having a thickness nearly the same as that of the CF resin layers 40R and 40G. Therefore, the electric capacitance Cds does not increase between the drain bus line 14 and the pixel electrode 16.

Even when the positions are deviated at the time of patterning the CF resin layers 40 according to this embodiment, the colors are not mixed, and the electric capacitance Cds does not increase, either. According to this embodiment, therefore, the CF resin layers 40 can be patterned relying upon the proximity exposure system having a relatively low precision, and the liquid crystal display device of the COT structure having a favorable display quality can be obtained at a low cost. In this embodiment, further, neither the resin BM nor the OC layer is formed, contributing to improving the yield of producing the TFT substrates 2. In this embodiment, further, no BM is formed on the side of the opposing substrate 4. Therefore, the aperture ratio does not decrease even if the TFT substrate 2 and the opposing substrate 4 are stuck together in a deviated manner.

The substrate for the liquid crystal display device according to this embodiment and the liquid crystal display device having the same will now be described below more concretely by way of Examples.

EXAMPLE 1

Figure 5:
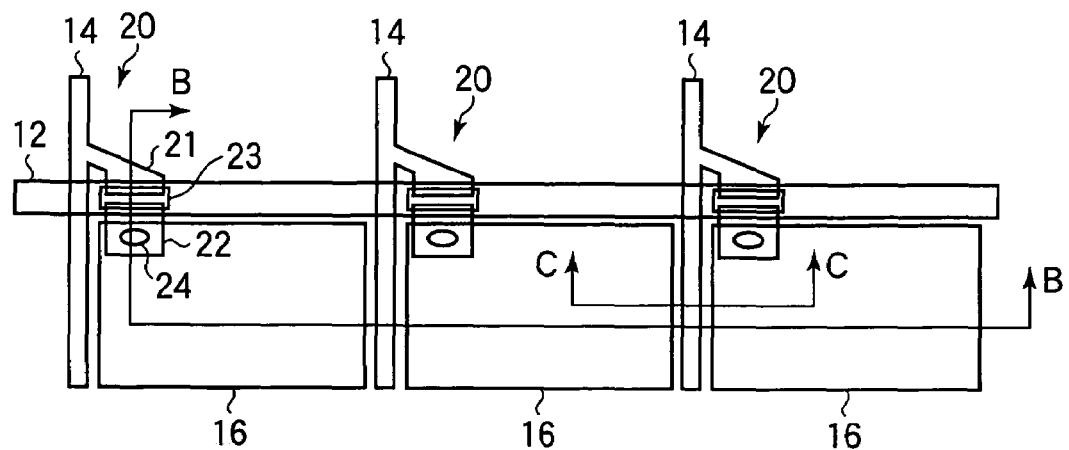
FIG. 5 is a view illustrating the constitution of the liquid crystal display device according to Example 1 of the embodiment of the invention.

FIG. 5 is a view illustrating the constitution in the vicinity of TFTs of three pixels in the liquid crystal display device according to Example 1 of the embodiment. Referring to FIG. 5, a TFT 20 is formed near a position where the gate bus line 12 intersects the drain bus line 14. A drain electrode 21 of the TFT 20 is electrically connected to the drain bus line 14, and a source electrode 22 is electrically connected to a pixel electrode 16 via a contact hole 24. A gate bus line 12 of a region just under the channel protection film 23 is working as a gate electrode of the TFT 20. In FIG. 5, none of the CF resin layers 40R, 40G, 40B and organic insulating layer 54 are illustrated.

Figure 6A:
FIGS. 6A to 6C are sectional views of steps illustrating a method of producing the substrate for the liquid crystal display device according to Example 1 of the embodiment of the invention.
Figure 7A:
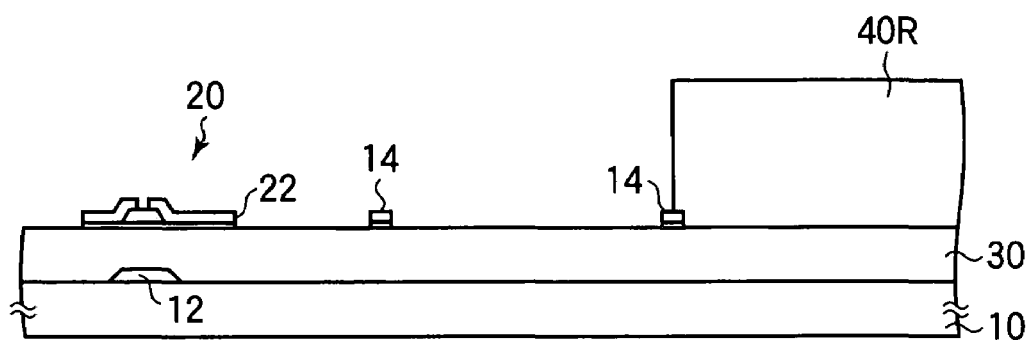
FIGS. 7A and 7B are sectional views of steps illustrating the method of producing the substrate for the liquid crystal display device according to Example 1 of the embodiment of the invention.
Figure 7B:
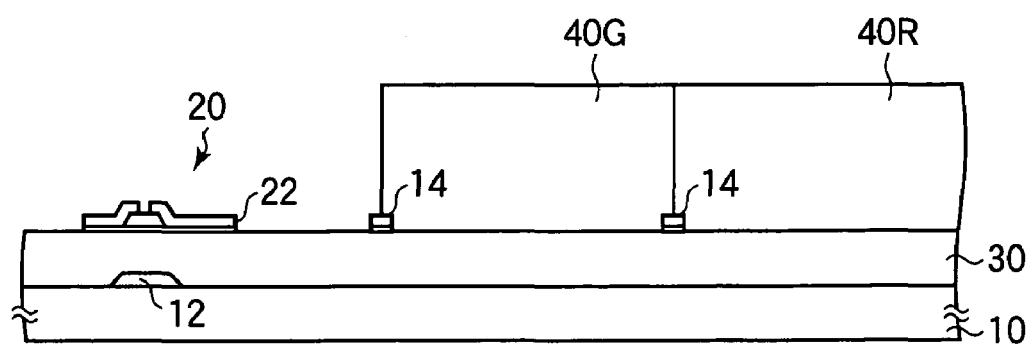
Figure 8A:
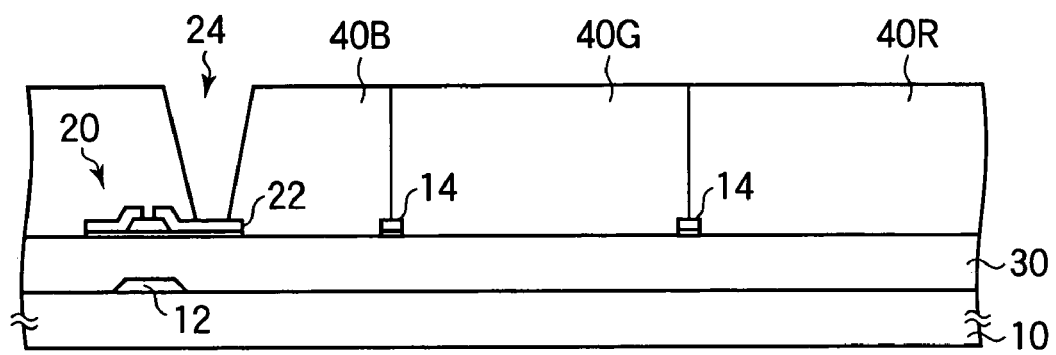
FIGS. 8A and 8B are sectional views of steps illustrating the method of producing the substrate for the liquid crystal display device according to Example 1 of the embodiment of the invention.
Figure 8B:
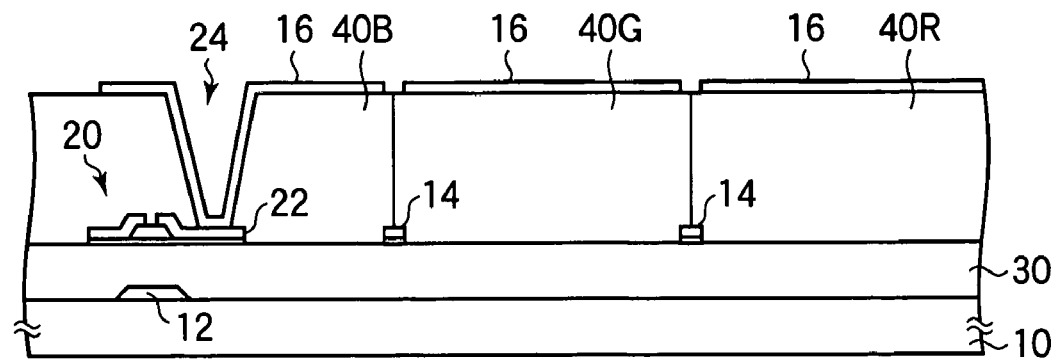
Figure 9:
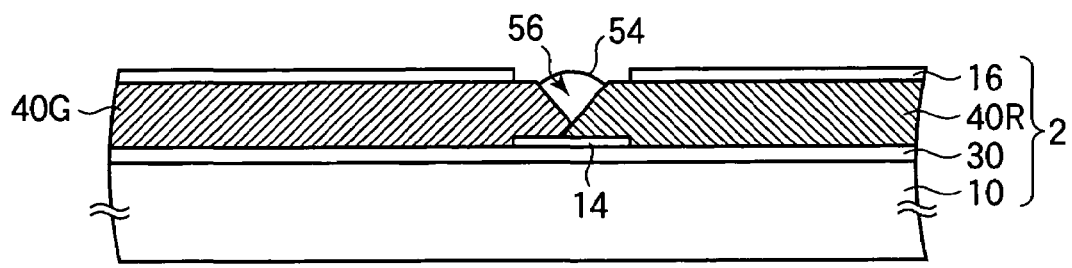
FIG. 9 is a sectional view of a step illustrating the method of producing the substrate for the liquid crystal display device according to Example 1 of the embodiment of the invention.

FIGS. 6A to 9 are sectional views of steps illustrating a method of producing the TFT substrate for the liquid crystal display device according to the embodiment. FIGS. 6A to 8B are sectional views cut along the line B-B in FIG. 5, and FIG. 9 is a sectional view cut along the line C-C in FIG. 5. Referring, first, to FIG. 6A, an aluminum (Al) layer having a thickness of, for example, 100 nm and a titanium (Ti) layer having a thickness of 50 nm are formed in this order on the whole surface of a transparent glass substrate 10, and are patterned by a photolithography method to form a gate bus line 12.

Figure 6B:
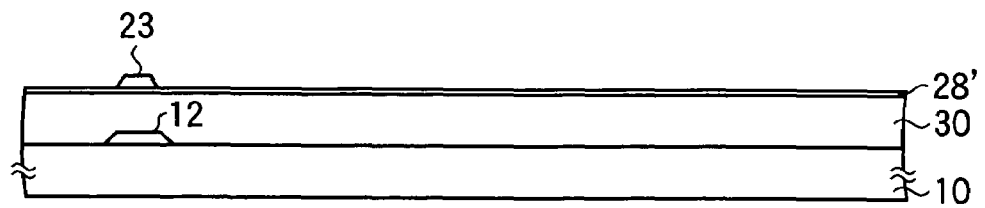

Referring, next, to FIG. 6B, an insulating film 30 which is, for example, a silicon nitride film (SiN film) having a thickness of 350 nm, an amorphous silicon (a-Si) layer 28' having a thickness of 30 nm and an SiN film having a thickness of 120 nm are continuously formed in this order on the whole surface of the substrate on the gate bus line 12. Then, a channel protection film 23 is formed in a self-aligned manner by patterning by using back surface exposure.

Figure 6C:
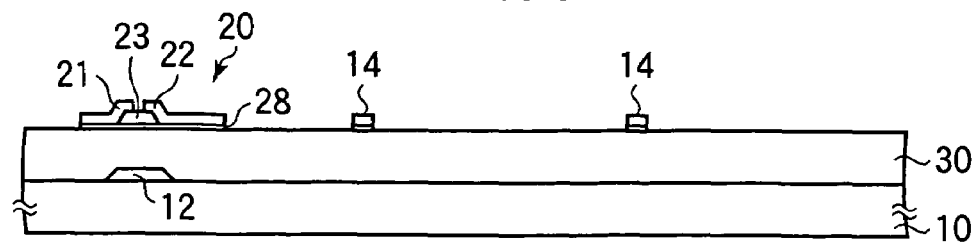

Next, an $n^+$ a-Si layer having a thickness of 30 nm, a Ti layer having a thickness of 20 nm, an Al layer having a thickness of 75 nm and a Ti layer having a thickness of 40 nm are formed in this order on the whole surface of the substrate. The films are, then, patterned by the photolithography method to form a drain bus line 14, a drain electrode 21 and a source electrode 22 of TFT 20, and an operation semiconductor layer 28 as shown in FIG. 6C. In this patterning, the channel protection film 23 serves as an etching stopper, and the operation semiconductor layer 28 under the channel protection film 23 remains without being etched. The TFT 20 is completed through the above steps.

Referring next to FIG. 7A, an R resist of the photosensitive pigment dispersion type is applied maintaining a thickness of, for example, 3.0 μm and is patterned by, for example, the proximity exposure system. In this patterning, a contact hole 24 is formed at the same time for exposing the surface of the source electrode 22 of the TFT 20. Thereafter, the CF resin layer 40R is post-baked to form an R pixel.

Referring next to FIG. 7B, a G resist of the photosensitive pigment dispersion type is applied maintaining a thickness of, for example, 3.0 μm and is patterned by, for example, the proximity exposure system. In this patterning, a contact hole 24 is formed at the same time for exposing the surface of the source electrode 22 of the TFT 20. Thereafter, the CF resin layer 40G is post-baked to form a G pixel. Though not illustrated in FIG. 7B, a groove portion 56 is formed between the neighboring CF resin layers 40R and 40G (see FIG. 9 appearing later). The groove portion 56 is formed having a broad width and a large depth when the CF resin layers 40R and 40G are patterned being deviated in a direction in which they separate away from each other, and are formed having a narrow width and a small depth when the CF resin layers 40R and 40G are patterned being deviated in a direction in which they approach each other.

Referring next to FIG. 8A, a B resist of the photosensitive pigment dispersion type is applied maintaining a thickness of, for example, 3.0 μm and is patterned by, for example, the proximity exposure system. In this patterning, a contact hole 24 is formed at the same time for exposing the surface of the source electrode 22 of the TFT 20. Thereafter, the CF resin layer 40B is post-baked to form a B pixel. Though not illustrated in FIG. 8A, groove portions 56 are formed between the neighboring CF resin layers 40G and 40B, and between the neighboring CF resin layers 40B and 40R in the same manner as described above.

Next, an ITO film of a thickness of, for example, 70 nm is formed on the whole surfaces of the CF resin layers 40R, 40G and 40B. The films are, then, patterned by the photolithography method to form a pixel electrode 16 for each pixel region as shown in FIG. 8B. The pixel electrode 16 is electrically connected to the source electrode 22 through the contact hole 24.

Next, the positive-type photo resist is applied maintaining a thickness of, for example, 2.0 μm and is patterned, followed by post-baking to form an organic insulating layer 54 which fills the groove portion 56 formed between the neighboring CF resin layers 40R and 40G as shown in FIG. 9. The TFT substrate 2 is completed through the above step. Not being limited to the materials for forming TFTs and CFs and the production process described above, it is also allowable to produce the TFT substrate 2 by using other materials and production processes.

Figure 10:
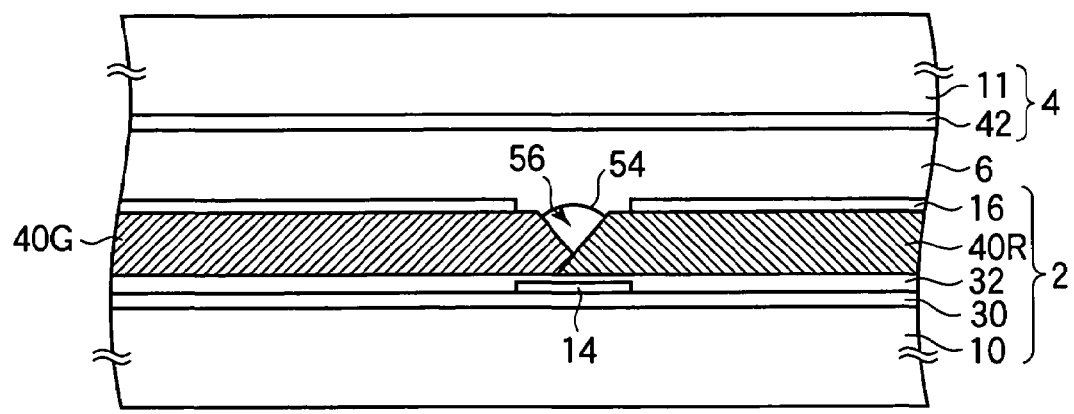
FIG. 10 is a sectional view illustrating a modified constitution of the liquid crystal display device according to Example 1 of the embodiment of the invention.

FIG. 10 illustrates a modified constitution of the liquid crystal display device according to the embodiment. In this modified example as shown in FIG. 10, the CF resin layer 40 is not formed directly on the drain bus line 14. Instead, a protection film 32 which is, for example, an SiN film is formed on the whole surface of the substrate on the drain bus line 14, and the CF resin layer 40 is formed on the protection film 32.

Figure 11:
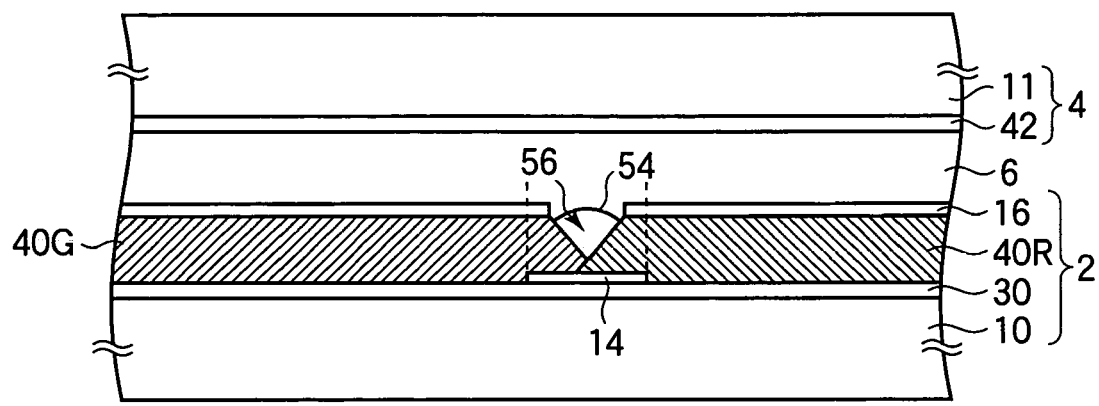
FIG. 11 is a sectional view illustrating an other modified constitution of the liquid crystal display device according to Example 1 of the embodiment of the invention.
Figure 12:
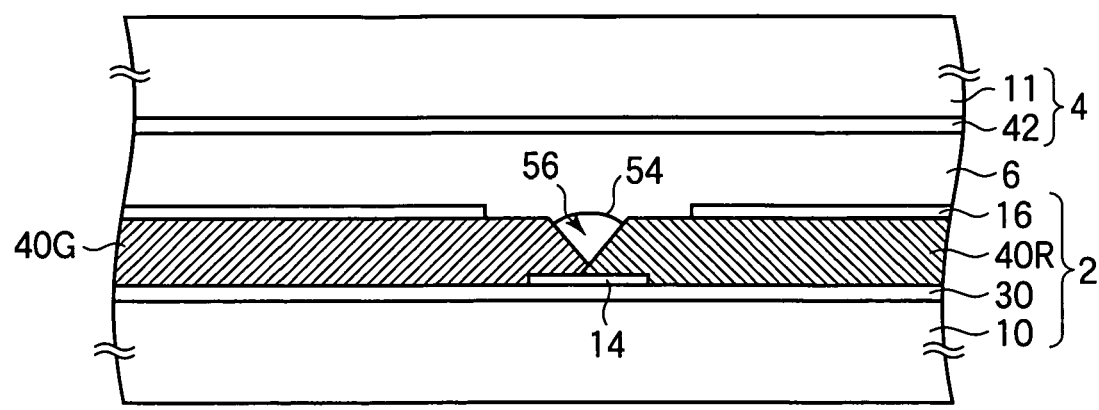
FIG. 12 is a sectional view illustrating a further modified constitution of the liquid crystal display device according to Example 1 of the embodiment of the invention.

FIGS. 11 and 12 illustrate other modified examples of the constitution of the liquid crystal display device of the embodiment. In the constitution shown in FIG. 2, if the substrate surface is viewed perpendicularly, the pixel electrode 16 and the drain bus line 14 are not overlapped, and the end of the pixel electrode 16 is nearly in agreement with the end of the drain bus line 14. In the constitution shown in FIG. 11, on the other hand, if the substrate surface is viewed perpendicularly, the pixel electrode 16 is formed overlapped on the drain bus line 14. In the constitution shown in FIG. 12, on the other hand, the pixel electrode 16 is formed being separated away from the drain bus line 14 if the substrate surface is viewed perpendicularly.

EXAMPLE 2

Figure 13:
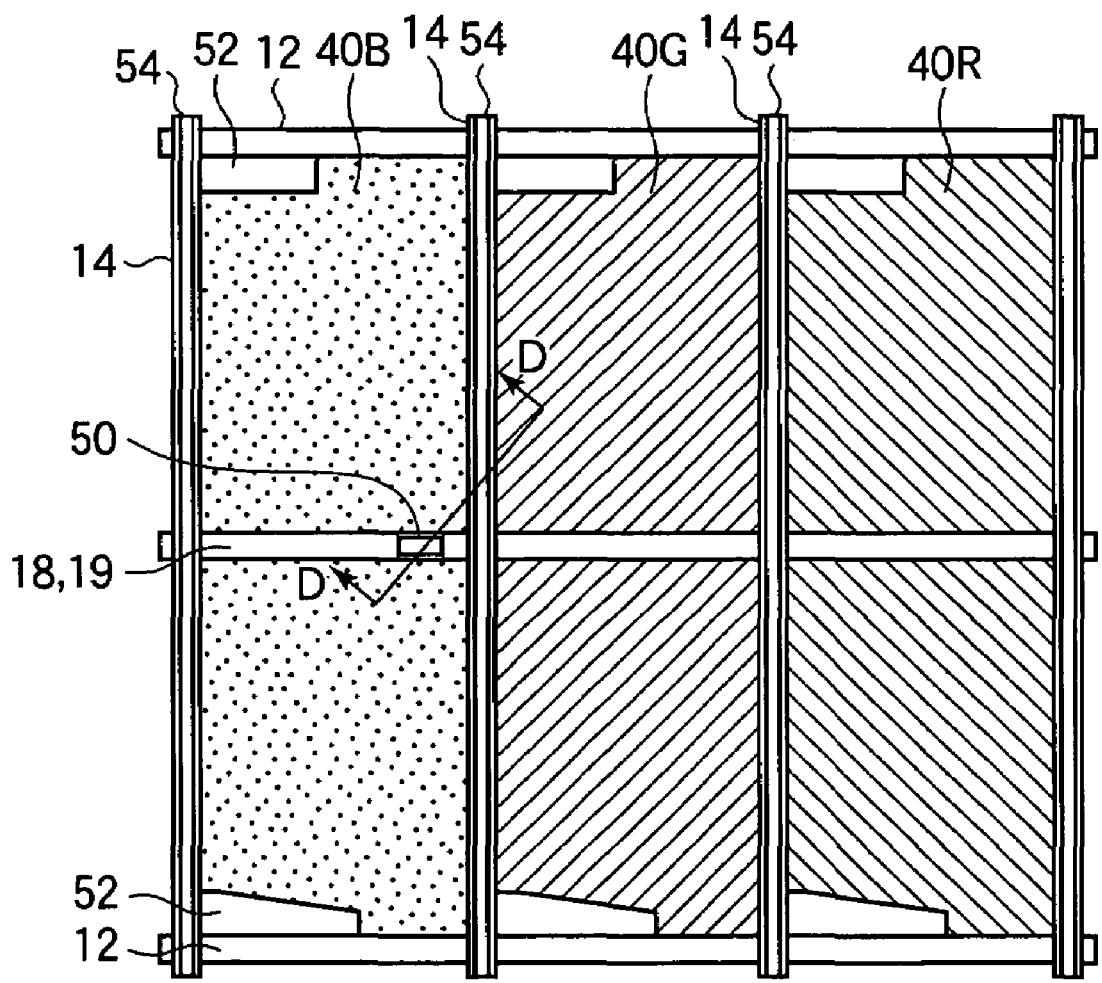
FIG. 13 is a view illustrating the constitution of the liquid crystal display device according to Example 2 of the embodiment of the invention.
Figure 14:
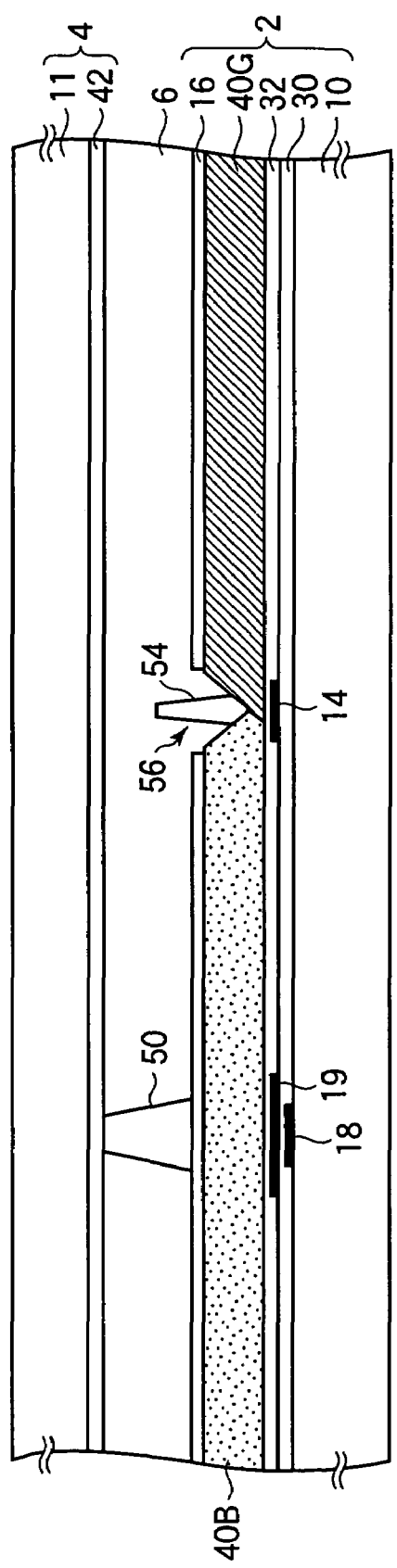
FIG. 14 is a sectional view illustrating the constitution of the liquid crystal display device according to Example 2 of the embodiment of the invention.

Next, the substrate for the liquid crystal display device according to Example 2 of the embodiment and the liquid crystal display device having the same will be described. FIG. 13 illustrates the constitution of three pixels R, G and B of the liquid crystal display device according to the embodiment. FIG. 14 is a sectional view illustrating the constitution of the liquid crystal display device cut along the line D-D in FIG. 13. Referring to FIGS. 13 and 14, a groove portion 56 is formed between the neighboring CF resin layers 40, and an organic insulating layer 54 is formed so as to fill the groove portion 56. In a region on the storage capacitor bus line 18 and the storage capacitor electrode 19, further, a pillar spacer 50 is formed to maintain a cell gap. The organic insulating layer 54 and the pillar spacer 50 are made of the same material.

Briefly described below is a method of producing the TFT substrate 2. A negative-type resist for a photo spacer is applied maintaining a thickness of, for example, 4.0 μm on the whole surface of the substrate after the pixel electrode 16 has been formed. Next, the pillar spacer 50 and the organic insulating layer 54 are simultaneously formed by patterning based on the photolithography method and post-baking. The TFT substrate 2 is completed through the above step. In this embodiment, the thickness (height) of the organic insulating layer 54 is nearly the same as the height of the pillar spacer 50. Since the groove portion 56 may be buried with the organic insulating layer 54, it is desired that the thickness of the organic insulating layer 54 is about 50% to about 150% of the thickness of the CF resin layer 40. According to this Example, the organic insulating layer 54 is formed simultaneously with the pillar spacer 50, and the TFT substrate 2 can be produced through a decreased number of steps.

EXAMPLE 3

Figure 15:
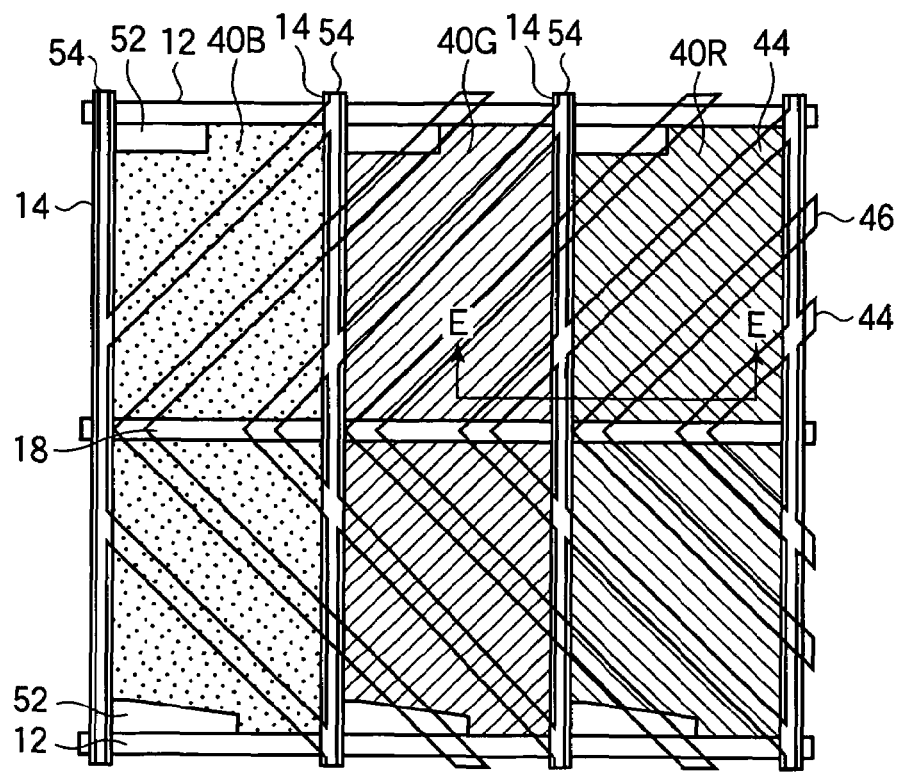
FIG. 15 is a view illustrating the constitution of the liquid crystal display device according to Example 3 of the embodiment of the invention.
Figure 16:
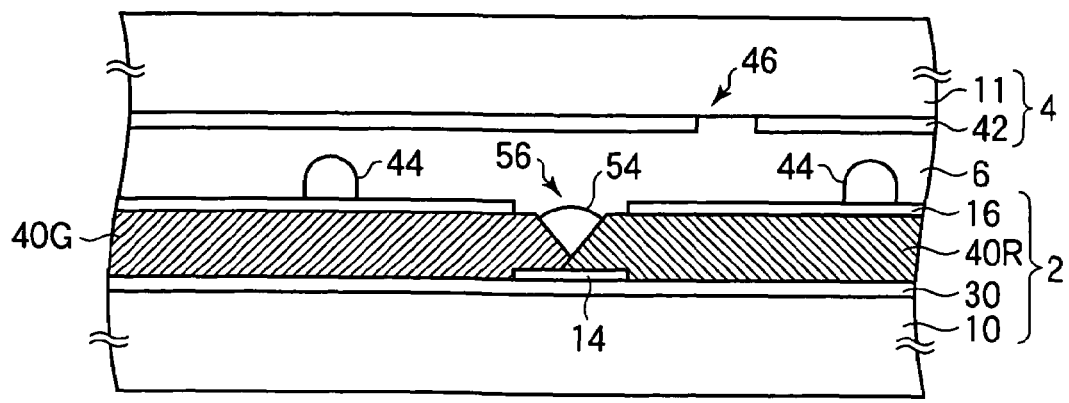
FIG. 16 is a sectional view illustrating the constitution of the liquid crystal display device according to Example 3 of the embodiment of the invention.

The substrate for the liquid crystal display device according to Example 3 of the embodiment and the liquid crystal display device having the same will be described next. The liquid crystal display device according to this embodiment is produced by sealing liquid crystal having a negative dielectric anisotropy between a pair of substrates the surfaces of which have been vertically aligned. The alignment of the liquid crystal is homeotropic in which the liquid crystal is aligned nearly perpendicularly to the surface of the substrate when no voltage is applied and is aligned obliquely relative to the surface of the substrate when a predetermined voltage is applied. FIG. 15 illustrates the constitution of three pixels R, G and B of the liquid crystal display device of this Example. FIG. 16 is a sectional view illustrating the constitution of the liquid crystal display device cut along the line E-E in FIG. 15. Referring to FIGS. 15 and 16, a linear protrusion 44 is formed on the pixel electrode 16 of the TFT substrate 2 extending obliquely to the end of the pixel region to serve as a structure for limiting the alignment of liquid crystal 6. Further, a groove portion 56 is formed between the neighboring CF resin layers 40, and an organic insulating layer 54 is formed so as to fill the groove portion 56. The organic insulating layer 54 and the linear protrusion 44 are formed by using the same material. Further, a slit (for drawing electrode) 46 is formed in the opposing substrate 4 in parallel with the linear protrusion 44 but being deviated by a half pitch.

Briefly described below is a method of producing the TFT substrate 2. After the pixel electrode 16 is formed, a positive-type photo resist is applied maintaining a thickness of, for example, 1.5 μm onto the whole surface of the substrate. Thereafter, the linear protrusion 44 and the organic insulating layer 54 are simultaneously formed by patterning based on the photolithography method and by post-baking. The TFT substrate 2 is completed through the above step. In this Example, the organic insulating layer 54 is formed simultaneously with the linear protrusion 44, and the TFT substrate 2 is produced through a decreased number of production steps.

Figure 17:
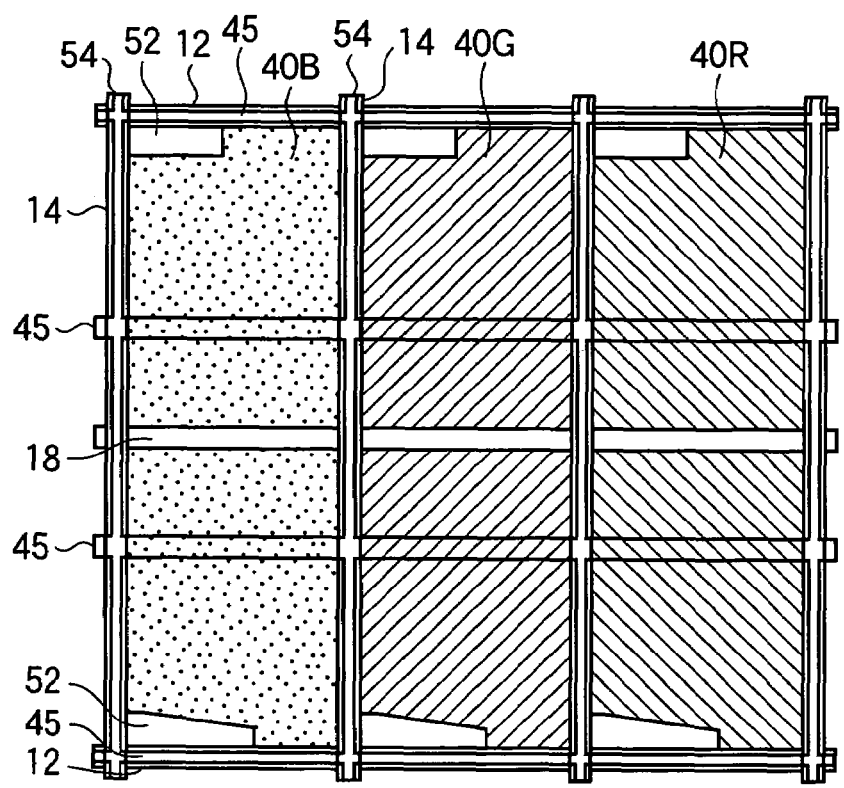
FIG. 17 is a view illustrating a modified constitution of the liquid crystal display device according to Example 3 of the embodiment of the invention.

FIG. 17 illustrates a modified example of the substrate for the liquid crystal display device according to the Example and the liquid crystal display device having the same. In this Example as illustrated in FIG. 17, no slit 46 is formed in the opposing substrate 4 but, instead, a linear protrusion 45 is formed on the TFT substrate 2. The linear protrusion 45 extends in parallel with the gate bus line 12, and is formed simultaneously with the organic insulating layer 54 using the same material. This Example deals with the liquid crystal display device of the VA mode but can also be applied to the liquid crystal display devices of other modes such as the TN mode and the like.

EXAMPLE 4

Figure 18:
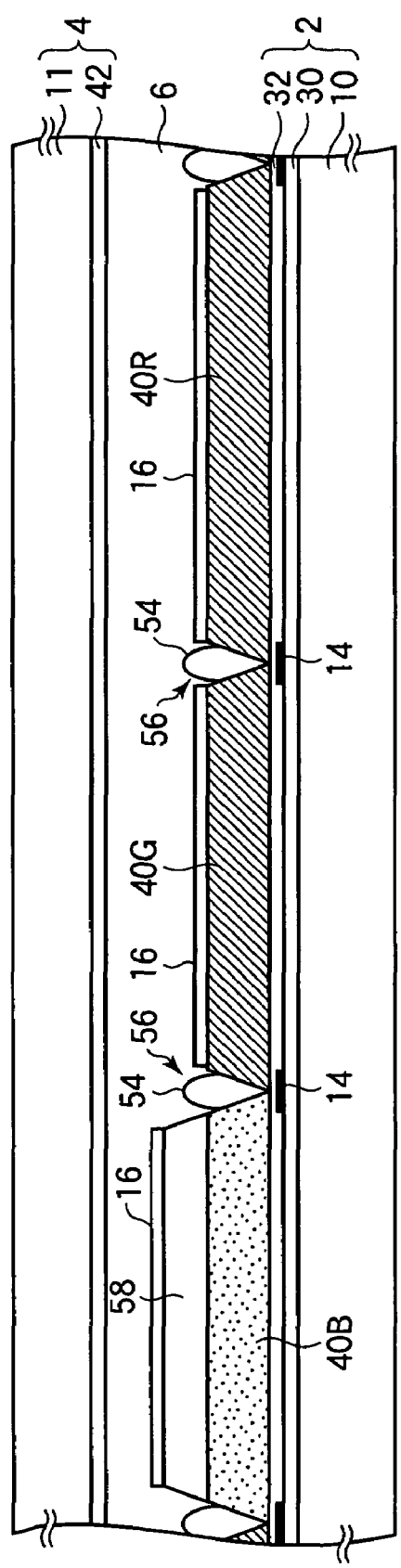
FIG. 18 is a sectional view illustrating the constitution of the liquid crystal display device according to Example 4 of the embodiment of the invention.

The substrate for the liquid crystal display device according to Example 4 of the embodiment and the liquid crystal display device having the same will be described next. FIG. 18 is a sectional view of when the liquid crystal display device of this Example is cut in parallel with the gate bus line. As illustrated in FIG. 18, the liquid crystal display device of this Example has a structure of the multi-gap type having a different cell gap in the pixel of at least any one color of R, G and B. In this Example, a cell gap-adjusting layer 58 of a predetermined thickness is formed on the CF resin layer 40B of the B pixel. Therefore, the cell gap in the B pixel becomes narrower than the cell gaps of other pixels. Further, the groove portion 56 is formed between the neighboring CF resin layers 40, and the organic insulating layer 54 is formed so as to fill the groove portion 56. The organic insulating layer 54 and the cell gap-adjusting layer 58 are formed of the same material.

Briefly described below is a method of producing the TFT substrate 2. After the CF resin layers 40R, 40G and 40B are formed, a transparent photo resist is applied maintaining a thickness of, for example, 1.5 μm onto the whole surface of the substrate. Thereafter, the cell gap-adjusting layer 58 and the organic insulating layer 54 are simultaneously formed by patterning based on the photolithography method and by post-baking. Then, an ITO film of a thickness of, for example, 70 μm is formed on the whole surface and is patterned to form a pixel electrode 16 for each pixel region. The TFT substrate 2 is completed through the above step. In this Example, the organic insulating layer 54 is formed simultaneously with the cell gap-adjusting layer 58, and the TFT substrate 2 is produced through a decreased number of production steps.

EXAMPLE 5

Figure 19:
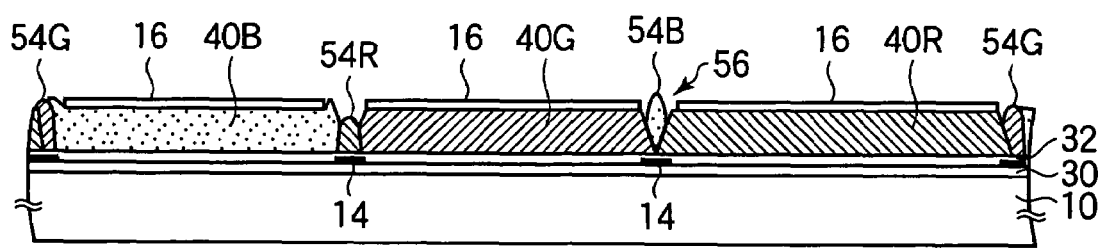
FIG. 19 is a sectional view illustrating the constitution of the substrate for the liquid crystal display device according to Example 5 of the embodiment of the invention.

The substrate for the liquid crystal display device according to Example 5 of the embodiment and the liquid crystal display device having the same will be described next. FIG. 19 is a sectional view of when the substrate for the liquid crystal display device of this Example is cut in parallel with the gate bus line. As illustrated in FIG. 19, the TFT substrate 2 has CF resin layers 40R, 40G and 40B of three colors. On the drain bus line 14 between the neighboring CF resin layers 40R and 40G of two colors, there is formed an organic insulating layer 54B of another color made of the same material as the CF resin layer 40B. Similarly, on the drain bus line 14 between the CF resin layers 40G and 40B, there is formed an organic insulating layer 54R made of the same material as the CF resin layer 40R. On the drain bus line 14 between the CF resin layers 40B and 40R, there is formed an organic insulating layer 54G of the same material as the CF resin layer 40G.

The organic insulating layers 54R, 54G and 54B work to fill the groove portion 56 formed between the neighboring CF resin layers 40 or work not to form the groove portion 56 between the neighboring resin layers 40. In this Example, the organic insulating layer 54B is so formed as to fill the groove portion 56 formed between the CF resin layers 40R and 40G. The CF resin layer 40G is so formed as to ride on the organic insulating layer 54R so will not to form the groove portion 56 relative to the CF resin layer 40B. The CF resin layer 40B is so formed as to ride on the organic insulating layers 54R and 54G thereby not to form the groove portion 56 relative to the CF resin layer 40G and relative to the CF resin layer 40R.

Figure 20A:
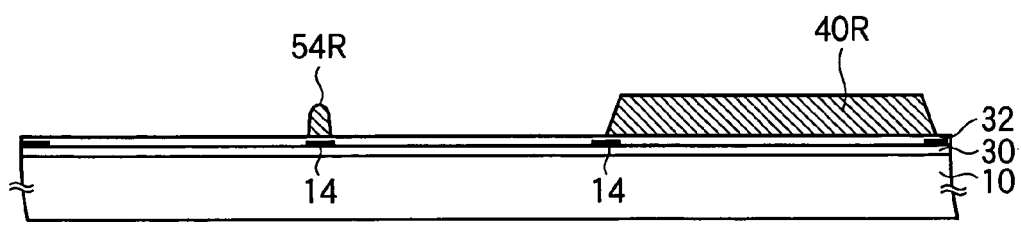
FIGS. 20A to 20C are sectional views of steps illustrating the method of producing the substrate for the liquid crystal display device according to Example 5 of the embodiment of the invention.
Figure 20B:
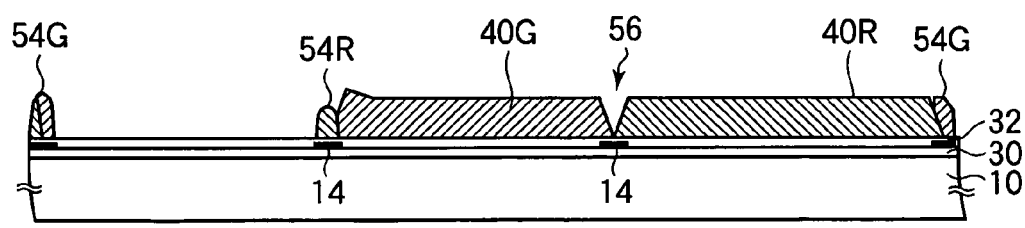
Figure 20C:
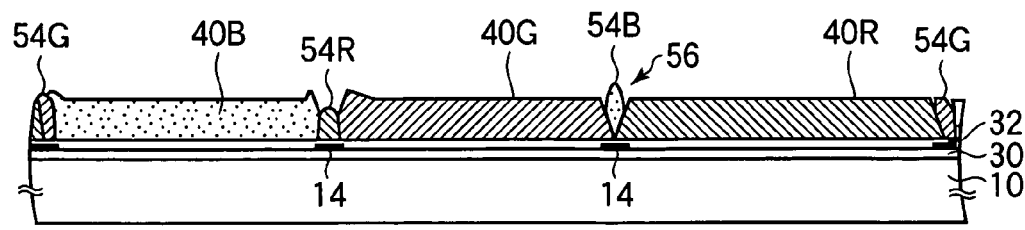
Figure 21:
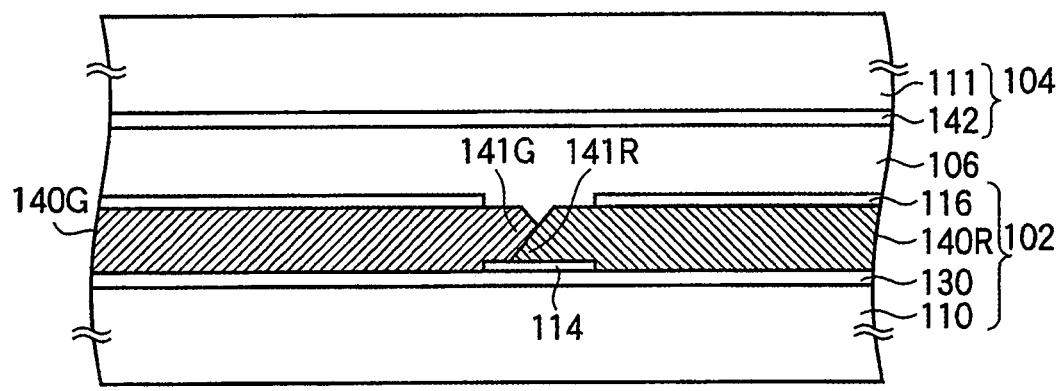
FIG. 21 is a sectional view illustrating the constitution of a conventional liquid crystal display device of the COT structure.
Figure 22:
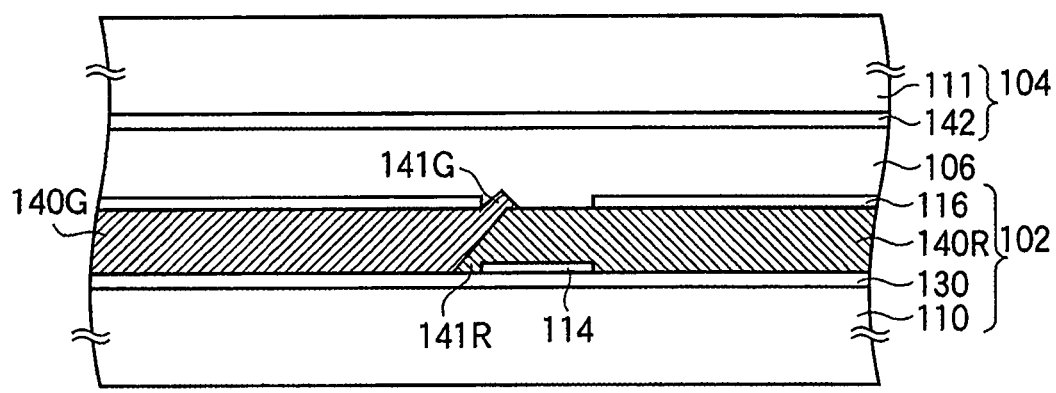
FIG. 22 is a sectional view illustrating the constitution of the liquid crystal display device of the COT structure in which the positions of the CF layers are deviated.
Figure 23:
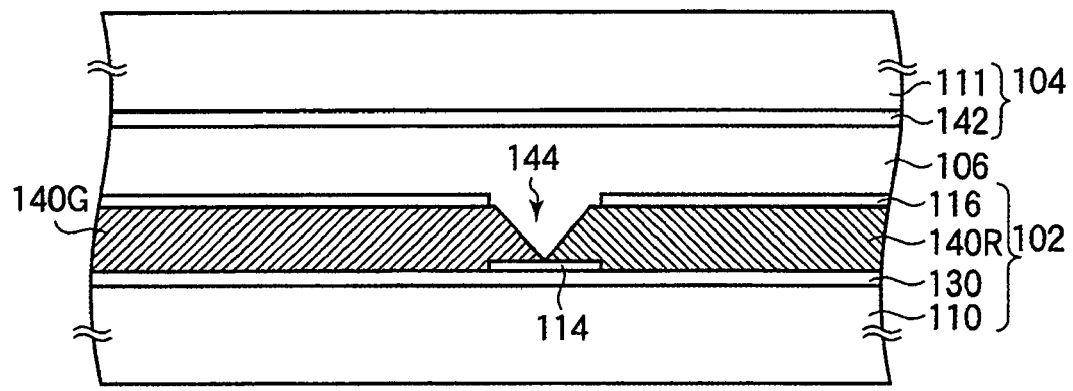
FIG. 23 is a sectional view illustrating the constitution of another liquid crystal display device of the COT structure.
Figure 24:
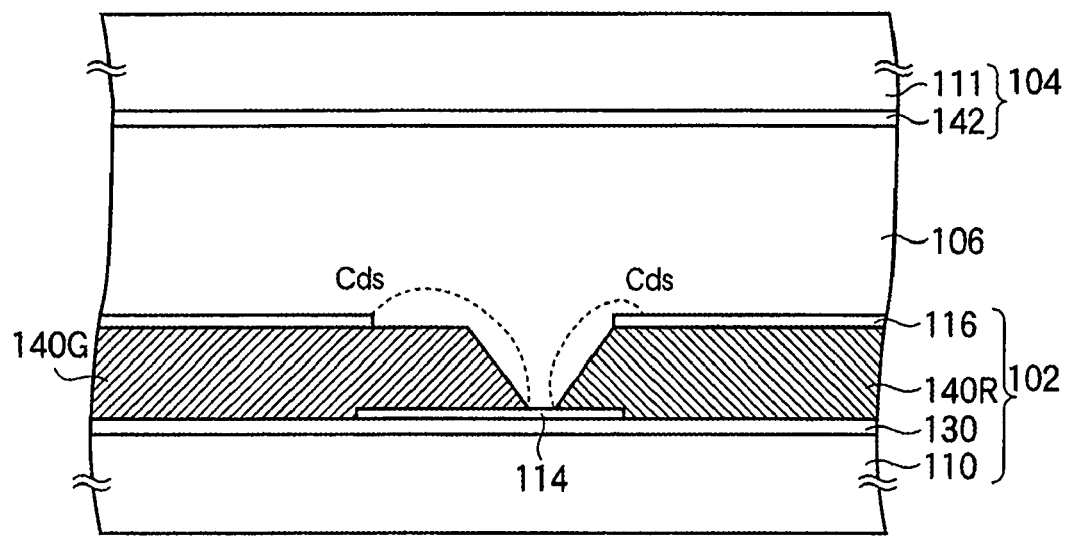
FIG. 24 is a view illustrating, on an enlarged scale, the vicinity of the drain bus line of the liquid crystal display device of the COT structure.

FIGS. 20A to 20C are sectional views of steps illustrating the method of producing the TFT substrate 2. After the formation of the drain bus line 14 and a protection film 32 thereon, an R resist of the photosensitive pigment dispersion type is applied maintaining a thickness of, for example, 3.0 μm onto the whole surface of the substrate. Thereafter, as shown in FIG. 20A, a CF resin layer 40R and an organic insulating layer 54R are simultaneously formed by patterning based on the photolithography method and by post-baking.

Next, a Gresist of the photosensitive pigment dispersion type is applied maintaining a thickness of, for example, 3.0 μm. Thereafter as shown in FIG. 20B, a CF resin layer 40G and an organic insulating layer 54G are simultaneously formed by patterning based on the photolithography method and by post-baking. Here, a groove portion 56 is formed between the CF resin layers 40R and 40G. The left end in the drawing of the CF resin layer 40G is so formed as to ride on the organic insulating layer 54R. The left end in the drawing of the organic insulating layer 54G is so formed as to ride on the right end in the drawing of the CF resin layer 40R. Here, if the patterning is deviated at the time of forming the CF resin layer 40G and the organic insulating layer 54G, the left end in the drawing of the CF resin layer 40G comes into contact with the organic insulating layer 54R, and the left end in the drawing of the organic insulating layer 54G comes into contact with the CF resin layer 40R.

Next, a B resist of the photosensitive pigment dispersion type is applied maintaining a thickness of, for example, 3.0 μm. Thereafter as shown in FIG. 20C, a CF resin layer 40B and an organic insulating layer 54B are simultaneously formed by patterning based on the photolithography method and by post-baking. Here, the right end in the drawing of the CF resin layer 40B is so formed as to ride on the organic insulating layer 54R, and the left end in the drawing of the CF resin layer 40B is so formed as to ride on the organic insulating layer 54G. The organic insulating layer 54B is so formed as to fill the groove portion 56 between the CF resin layers 40R and 40G. Here, even if the patterning is deviated at the time of forming the CF resin layer 40B and the organic insulating layer 54B, the right end in the drawing of the CF resin layer 40B comes into contact with the organic insulating layer 54R, and the left end in the drawing of the CF resin layer 40B comes into contact with the organic insulating layer 54G. Therefore, no groove portion 56 is formed between the CF resin layers 40G and 40B or between the CF resin layers 40B and 40R. Next, an ITO film of a thickness of, for example, 70 μm is formed on the whole surface and is patterned to form a pixel electrode 16 for each pixel region. The TFT substrate 2 illustrated in FIG. 19 is completed through the above steps.

In this Example, the organic insulating layer 54 is so formed as to fill the groove portion 56 formed between the neighboring CF resin layers 40 or is so formed as will not develop the groove portion 56 between the CF resin layers 40 even in case the patterning is deviated. Therefor, the electric capacitance Cds does not increase even in case the patterning is deviated in forming the CF resin layers 40, making it possible to obtain a liquid crystal display device of the COT structure having good display quality at a low cost. According to this embodiment, further, the organic insulating layers 54R, 54G and 54B are formed simultaneously with the CF resin layers 40R, 40G and 40B, and the TFT substrate 2 is produced through a decreased number of steps.

The invention can be modified in a variety of ways not being limited to the above Examples only. The above Examples have dealt with the substrates for the liquid crystal display device equipped with the TFTs of the channel protection film type. Not being limited thereto only, however, the invention can also be applied to the substrate for the liquid crystal display device equipped with the TFTs of the channel etching type.

What is claimed is:

1. A substrate for a liquid crystal display device, comprising:
   a base substrate for holding liquid crystal together with an opposing substrate that is disposed in an opposing manner;
   a plurality of pixel regions arranged on the base substrate;
   a plurality of bus lines formed on the base substrate and intersecting one another via an insulating film;
   color filter layers of a plurality of colors the ends of which are arranged on the bus lines;
   a pixel electrode formed for each pixel region on the color filter layers;
   a groove portion formed between the ends of the neighboring color filter layers; and
   an organic insulating layer formed only above the bus lines so as to fill the groove portion to decrease an electric capacitance that occurs between the bus line and the pixel electrode.

2. A substrate for a liquid crystal display device according to claim 1, further comprising a protrusion for controlling the alignment of the liquid crystal, wherein the organic insulating layer is formed of the same material as the protrusion for controlling the alignment.

3. A substrate for a liquid crystal display device according to claim 1, further comprising a pillar spacer for maintaining a cell gap relative to the opposing substrate, wherein the organic insulating layer is formed of the same material as the pillar spacer.

4. A substrate for a liquid crystal display device according to claim 1, further comprising a cell gap-adjusting layer formed on the color filter layer of at least one color, wherein the organic insulating layer is formed of the same material as the cell gap-adjusting layer.

5. A substrate for a liquid crystal display device according to claim 1, wherein the organic insulating layer is formed of the same material as the color filter layers.

6. A substrate for a liquid crystal display device according to claim 1, wherein the thickness of the organic insulating layer is not smaller than 50% but is not larger than 150% of the thickness of the color filter layers.

7. A substrate for a liquid crystal display device according to claim 2, wherein the thickness of the organic insulating layer is not smaller than 50% but is not larger than 150% of the thickness of the color filter layers.

8. A substrate for a liquid crystal display device according to claim 3, wherein the thickness of the organic insulating layer is not smaller than 50% but is not larger than 150% of the thickness of the color filter layers.

9. A substrate for a liquid crystal display device according to claim 4, wherein the thickness of the organic insulating layer is not smaller than 50% but is not larger than 150% of the thickness of the color filter layers.

10. A substrate for a liquid crystal display device according to claim 5, wherein the thickness of the organic insulating layer is not smaller than 50% but is not larger than 150% of the thickness of the color filter layers.

11. A substrate for a liquid crystal display device according to claim 1, wherein the organic insulating layer and the pixel electrode are adjacent to the liquid crystal via an alignment film.

12. A substrate for a liquid crystal display device, comprising:
   a base substrate for holding liquid crystal together with an opposing substrate that is disposed in an opposing manner;
   a plurality of pixel regions arranged on the base substrate;
   a plurality of bus lines formed on the base substrate and intersecting one another via an insulating film;
   color filter layers of three or more colors the ends of which are arranged on the bus lines;
   a pixel electrode formed for each pixel region on the color filter layers; and
   an organic insulating layer arranged only above the bus lines between the ends of the neighboring color filter layers of two colors so as to decrease an electric capacitance that occurs between the bus line and the pixel electrode, and formed of the same material as the color filter layer of a color other than the above two colors.

13. A substrate for a liquid crystal display device according to claim 12, wherein the organic insulating layer and the pixel electrode are adjacent to the liquid crystal via an alignment film.

14. A liquid crystal display device having a pair of substrates arranged opposed to each other, and liquid crystal sealed between the pair of substrates, wherein one of the pair of substrates is a substrate for a liquid crystal display device according to claim 1.

15. A liquid crystal display device having a pair of substrates arranged opposed to each other, and liquid crystal sealed between the pair of substrates, wherein one of the pair of substrates is a substrate for a liquid crystal display device according to claim 12.

16. A liquid crystal display device according to claim 14, wherein the liquid crystal has a negative dielectric anisotropy and is aligned nearly perpendicularly to the pair of substrates when no voltage is applied.

17. A liquid crystal display device according to claim 15, wherein the liquid crystal has a negative dielectric anisotropy and is aligned nearly perpendicularly to the pair of substrates when no voltage is applied.

* * * * *